2,727,817
METHOD OF PRODUCING TITANIUM AND RECOVERING SODIUM

Thomas P. Whaley, Royal Oak, Mich., assignor to Ethyl Corporation, New York, N. Y., a corporation of Delaware No Drawing. Application September 23, 1953, Serial No. 382,011

4 Claims. (Cl. 75—84)

This invention relates to the manufacture of titanium and in particular to a new and improved process whereby titanium is produced along with sodium of highly purified distilled grade.

Titanium has long been recognized as a potentially extremely important material, particularly for structural purposes, as it has the advantage of strengths on the order of those of steels and, in addition, possesses much lower specific gravity. Much effort has therefore been devoted to development of methods for winning this metal from its oxides and other compounds. The methods proposed to date have not been entirely satisfactory for one reason or another, such as economics, rigorous conditions required, and the necessity for utilizing an undue number of processing operations, etc. For many uses it is important that a ductile grade of the metal be available.

It has been proposed to utilize a mixture of 68 per cent calcium and 32 per cent sodium to produce titanium from its oxide. However, this method is capable of producing only titanium of about 83 per cent purity, a grade which does not approach that necessary for a ductile product and which further must be subjected to rather drastic subsequent treatment to render it ductile.

An object of the present invention is to provide a new and improved process for the manufacture of titanium. Still another object is to provide a method for the production of distilled sodium. A further object is to provide a process for the simultaneous manufacture of titanium metal and distilled sodium. Another object is to provide a new and improved process for the conversion of titanium oxide to metallic titanium of a quality such that it can be readily converted by convenient treatment to the ductile form. A further object is to produce a process for the preparation of titanium from titanium dioxide using inexpensive by-products of chemical manufacturing operations as the reagent.

These and other objects of the present invention are accomplished by reducing titanium dioxide at elevated temperature with the so-called "sludge" produced by electrolysis of molten sodium chloride in the presence of calcium chloride as a melting point depressant. In the production of sodium by electrolysis of fused sodium chloride, calcium chloride is added to the electrolyte in order to lower its melting point. During the electrolysis, calcium metal, as well as sodium, is produced at the cathode and at the temperature of operation dissolves in the sodium melt. When this solution is removed from the cell, it is cooled, and most of the calcium crystallizes out. This crude mixture containing calcium metal is purified, usually by mechanical separation, and most of the sodium recovered therefrom. The residue or sludge obtained from such separation consists of a mixture of solids containing crystals of calcium embedded in a matrix of sodium, and it also contains impurities such as sodium and calcium oxides and chlorides. The total amount of metals in the residue varies, but in general it is from 90 to 95 per cent. The amount of calcium contained therein ranges up to 30 per cent. It is sometimes convenient to concentrate this sludge by filtration or other means to the point at which the total metal content is about 80 per cent and the metallic calcium content ranges up to about 50 per cent of the total metal present. Furthermore, the calcium found in mixtures obtained as described above consists essentially of at least 80 per cent of platelets, the major diameters of which vary between ⅛ inch and ¹⁄₂₀₀ inch. It has been found that this particular type of sodium-calcium mixture, in contrast to other sodium-calcium mixtures such as that referred to above, possesses the unexpected property of reacting with titanium dioxide at elevated temperature to produce titanium of greater than 95 per cent purity and at the same time yielding distilled sodium, a premium by-product. The purity of the titanium metal produced in my process is such that, depending upon conditions used, it is either ductile or can be converted to the ductile product by relatively simple subsequent operations. The following example illustrates one mode of carrying out the present invention.

Example I

In a reactor equipped with means for external heating, means for charging and withdrawing liquid and solid reactants and products, an overhead line for removal of gaseous materals, and means for providing a blanket of rare gas, titanium dioxide (100 parts by weight) is reacted with 1000 parts of sodium-calcium sludge obtained as a by-product of Downs cell sodium production and containing 20 per cent metallic calcium. Reaction is carried out at temperature of 900° C. for a period of 1.5 hours. At the end of this time the mixture is heated to 1100° C. and the sodium removed through a take-off line and condensed in an air-cooled condenser. The titanium is isolated from the reactor by first washing with alcohol, then with dilute acid, then with water, and finally drying. The product is found to comprise titanium metal of over 95 per cent purity. The sodium which is collected in the air-cooled condenser is found to meet the specifications for distilled grade sodium.

My process is especially adaptable to continuous operation, as the following example illustrates.

Example II

To an externally heated reactor is fed continuously titanium dioxide and sodium-calcium sludge containing 40 per cent calcium. The feed rates are respectively 100 parts per hour of titanium dioxide and 625 parts per hour of sodium-calcium sludge. The reactor is designed so that the average residence time of reactants therein is about 30 minutes. The temperature of the reactor is maintained at 1050° C., at which temperature the sodium is above its boiling point and is taken off through a distillation head attached to the reactor and condensed in an air-cooled condenser. The reaction mixture is continuously withdrawn from the reactor and treated as in Example I to recover titanium metal of over 95 per cent purity. The sodium taken off overhead is found to be of distillation grade quality.

The temperature of reaction should be one at which the sodium is above its boiling point at the pressure employed. Generally it is most convenient to operate at atmospheric pressure, and in this case temperatures of at least 880° C. are preferred. However, good results can be obtained at temperatures as low as about 700° C. providing sufficient vacuum is maintained in the system so that the sodium boils.

For best results it has been found that the reaction mixture should be maintained at reaction temperature for at least about 30 minutes and preferably from 1 to 4 hours. It is to be understood, however, that titanium is formed in even shorter periods of time at reaction temperature than this, although in lower yields.

For best results it is helpful to use efficient agitation in the reaction vessel. This can be done by mechanical stirring, plunging, use of ball-mill type equipment, and the like.

In all modifications of the present invention it is important that the reaction mixture be submerged in an atmosphere which is inert to titanium. Since titanium reacts with oxygen, nitrogen, and hydrogen, particularly at elevated temperatures, and since in many cases such reaction results in the formation of a brittle form of titanium, it is preferred to use gases of the rare gas series, such as argon, helium, neon, etc., for the blanketing.

As mentioned above, one of the features of the present invention is that the product produced can be converted to ductility grade material by simple refining procedures. One such procedure is simple degassing of the molten material by heating in a vacuum. It is possible to do this with my product since I obtain a material of over 85-90 per cent purity, and it has been established by other workers that a product of this degree of purity consists essentially of titanium metal having oxygen in solid solution. On the other hand, material of purity less than 85-90 per cent, such as is formed in the reaction of titanium dioxide with the 68 per cent calcium-32 per cent sodium mixture, consists of dissolved oxygen, titanium, and combined oxygen; that is, oxygen in oxide form. Oxygen in oxide form cannot be removed by simple degassing.

The reaction that takes place in the process of my invention can be represented by the equation

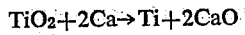

$$TiO_2 + 2Ca \rightarrow Ti + 2CaO$$

The amount of sludge chosen may be even less than the amount called for by the above equation and some titanium will result. However, it is preferred to use at least enough sludge so as to have a stoichiometric amount of calcium present, and in general excesses of calcium are preferred. The use of sufficient sludge so as to have calcium in excess is advantageous in driving the reaction to completion, and the excess sludge also serves as a flux which aids materially in contacting of the reactants. One embodiment of the present invention with which exceptionally good results are obtained comprises conducting the reaction in an essentially infinite excess of sludge so that the boiling sludge serves both as a flux and aids in agitating the reaction mixture. This latter embodiment is particularly helpful when carrying out the process continuously.

Although the invention has been illustrated chiefly with simple titanium dioxide, it is to be understood that mixed oxides of titanium are also adaptable to my process. For example, ilmenite, $FeO \cdot TiO_2$, when used in accordance with the conditions described above, gives high purity titanium in good yield. Whatever the oxide used, it is important that it be carefully dried before reaction with the sodium-calcium sludge.

I claim:

1. A process for the production of titanium and recovery of distilled grade sodium, comprising reacting an oxide of titanium at a temperature above the boiling point of sodium at the pressure employed, said temperature being at least about 700° C., with a mixture consisting essentially of sodium and calcium, said calcium consisting of at least 80 per cent by weight of platelets, the major diameters of which vary between 1/8 and 1/800 inch, the amount of calcium being not more than 50 per cent by weight of the total amount of metallic calcium and sodium present, and said mixture being present in amount such that at least the stoichiometric amount of calcium is present based upon said oxide of titanium; recovering unreacted sodium from the reaction mixture by volatilization; and recovering titanium of purity greater than about 95 per cent from the residual reaction mixture.

2. A process for the production of titanium and recovery of distilled grade sodium, comprising reacting titanium dioxide at a temperature above the boiling point of sodium at the pressure employed, said temperature being at least about 700° C., with sludge consisting essentially of sodium and calcium containing up to 40 per cent by weight metallic calcium, said sludge being present in amount such that at least the stoichiometric amount of calcium is present based upon said titanium dioxide; recovering unreacted sodium from the reaction mixture by volatilization; and recovering titanium of purity greater than about 95 per cent from the residual reaction mixture.

3. A process for the simultaneous production of titanium and recovery of distilled grade sodium, comprising reacting titanium dioxide at a temperature above the boiling point of sodium at the pressure employed, said temperature being at least about 880° C., with sludge consisting essentially of sodium and calcium containing up to 40 per cent by weight metallic calcium, said sludge being present in amount such that at least the stoichiometric amount of calcium is present based upon said titanium dioxide; recovering unreacted sodium from the reaction mixture by volatilization; and recovering titanium of purity greater than about 95 per cent from the residual reaction mixture.

4. A process for the production of titanium and recovery of distilled grade sodium, comprising reacting about 100 parts by weight of titanium dioxide with about 1000 parts of sludge of the type produced in Downs cell production of sodium consisting essentially of sodium and calcium and containing about 20 per cent by weight metallic calcium at a temperature above the boiling point of sodium at the pressure employed, said temperature being about 900° C., for substantially 1.5 hours in an inert atmosphere; recovering unreacted sodium from the reaction mixture by volatilization; and recovering titanium of purity greater than about 95 per cent from the residual reaction mixture.

References Cited in the file of this patent

UNITED STATES PATENTS

| | | |
|---|---|---|
| 1,573,083 | Marden et al. | Feb. 16, 1926 |
| 1,648,954 | Marden | Nov. 15, 1927 |
| 1,659,209 | Marden | Feb. 14, 1928 |
| 1,704,257 | Marden et al. | Mar. 5, 1929 |
| 1,783,669 | Rich | Dec. 10, 1929 |
| 1,814,719 | Marden et al. | July 14, 1931 |
| 2,205,854 | Kroll | June 25, 1940 |
| 2,537,068 | Lilliendahl et al. | Jan. 9, 1951 |
| 2,546,320 | Rostron | Mar. 27, 1951 |

FOREIGN PATENTS

| | | |
|---|---|---|
| 230,865 | Great Britain | Dec. 10, 1925 |
| 354,785 | Great Britain | Aug. 10, 1931 |

OTHER REFERENCES

Chemical Abstracts, vol. 17, 1923, page 3143.

Zeitschrift fur Anorganische und Allgemeine Chemie, vol. 129, 1923, pages 267-275.

Titanium, by Barksdale, pub. 1949 by The Ronald Press Co., New York, page 43.